No. 795,985. PATENTED AUG. 1, 1905.
F. H. KERR.
MACHINE FOR THINNING ROWS OF PLANTS.
APPLICATION FILED SEPT. 13, 1904.
2 SHEETS—SHEET 1.
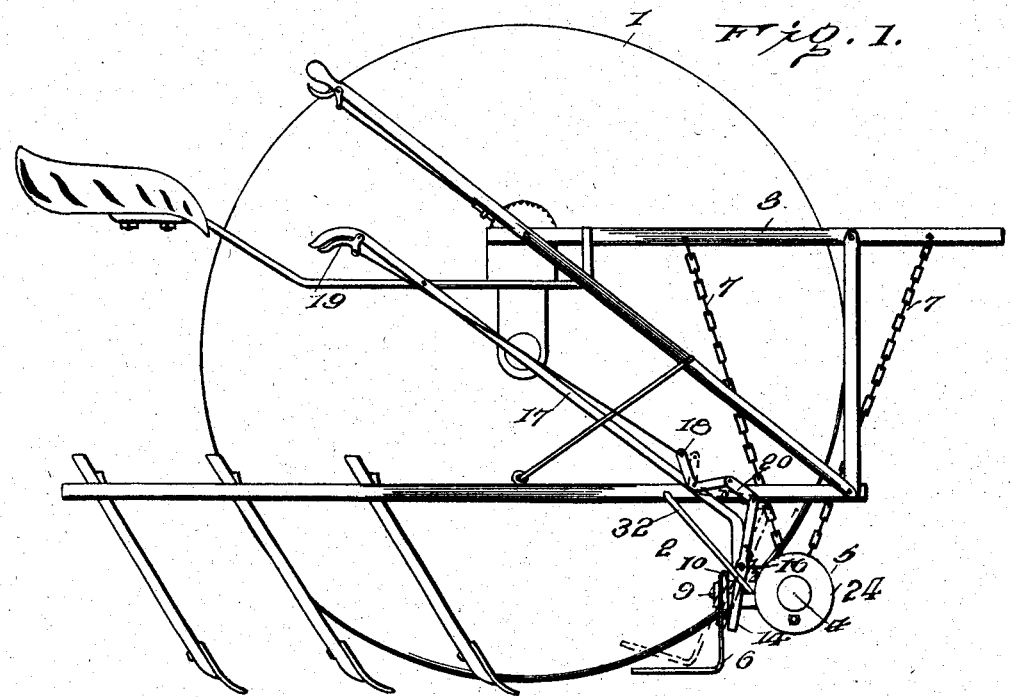
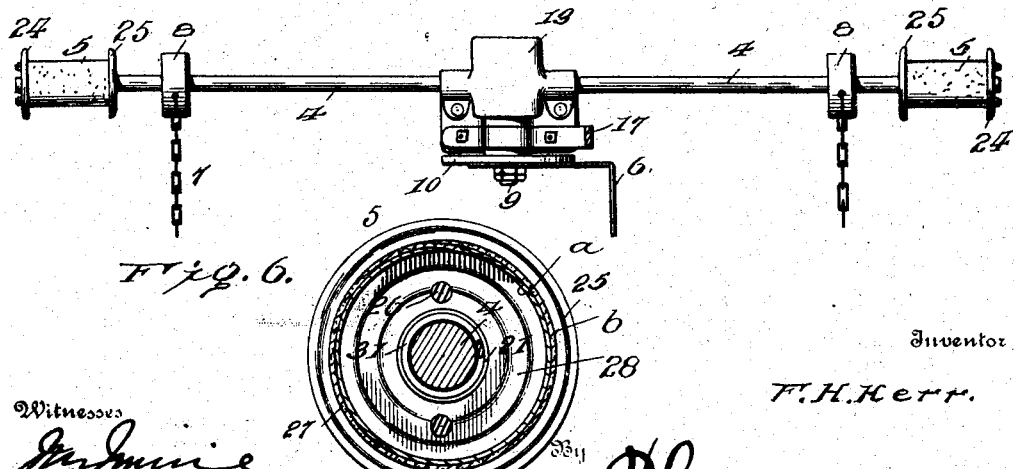
Witnesses
Inventor
F. H. Kerr.
Attorneys

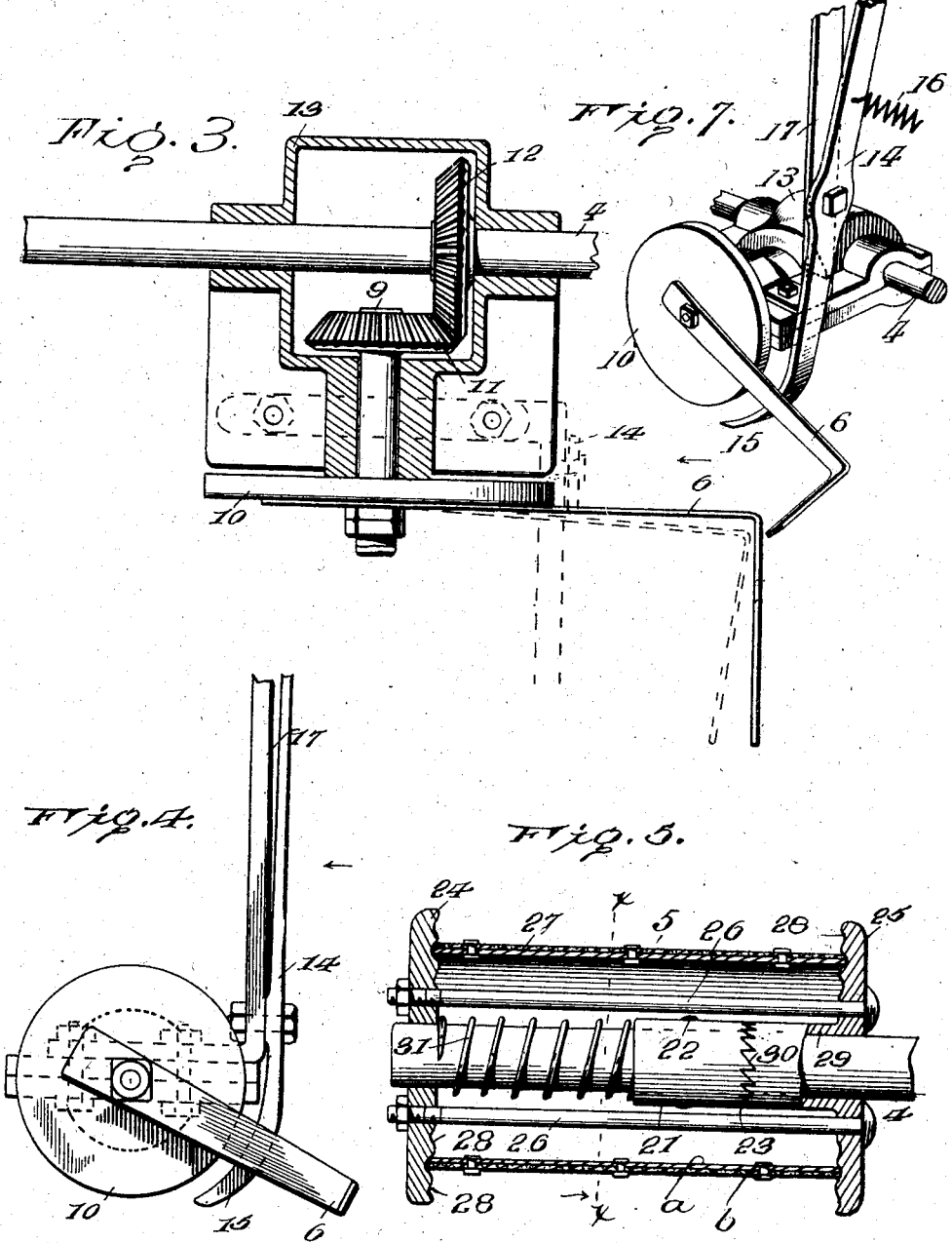

UNITED STATES PATENT OFFICE.

FRANKLIN H. KERR, OF ROOSEVELT, OKLAHOMA TERRITORY.

MACHINE FOR THINNING ROWS OF PLANTS.

No. 795,985.           Specification of Letters Patent.           Patented Aug. 1, 1905.

Application filed September 13, 1904. Serial No. 224,315.

*To all whom it may concern:*

Be it known that I, FRANKLIN H. KERR, a citizen of the United States, residing at Roosevelt, in the county of Kiowa, Territory of Oklahoma, have invented certain new and useful Improvements in Machines for Thinning Rows of Plants, of which the following is a specification.

The primary object of this invention is the provision of a mechanism in the form of an attachment which may be readily applied to any type of riding cultivator for thinning cotton or other plants sown in drills and subsequently required to be chopped out at intervals to leave isolated plants only standing. By providing the invention in the form of an attachment the work is greatly facilitated and the cost of cultivation appreciably reduced, since both operations of cultivating and thinning may be simultaneously performed.

In devising the invention provision is had for automatic operation of the cutting mechanism, as well as to enable the same to be controlled by hand at an instant's notice, whereby sickly plants may be cut down and healthy plants left standing regardless of the regular spacing or distance between the plants left standing.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a side elevation of a cultivator provided with an attachment constructed in accordance with the invention, the ground-wheel on the near side being omitted. Fig. 2 is a plan view of the attachment. Fig. 3 is a horizontal section of the housing protecting and supporting the drive-gearing, showing a portion of the shaft and the cutter, the latter being shown in frictional engagement with its drive-wheel by full lines and moved away from said drive-wheel by dotted lines. Fig. 4 is a rear view of the parts illustrated in Fig. 3. Fig. 5 is a longitudinal section of a friction-driver at the outer end of the operating-shaft. Fig. 6 is a transverse section of a roller on the line $x$ $x$ of Fig. 5 looking in the direction of the arrows. Fig. 7 is a detail perspective view of the parts shown in Figs. 3 and 4, showing more clearly the relative arrangement of the elements.

Corresponding and like parts are referred to in the following description and indicated in all the views of the drawings by the same reference characters.

The cultivator illustrated is of ordinary type and is shown simply to demonstrate the application of the invention. The ground-wheels of the cultivator are indicated at 1, the cultivator proper at 2, and the main frame at 3.

The attachment comprises the shaft 4, provided at opposite ends with rollers 5 to engage frictionally with the rims of the ground-wheels 1, a cutter 6, and actuating mechanism therefor, deriving motion from the shaft 4. The shaft 4 may be supported in any manner so long as its rollers 5 remain in contact with the ground-wheels 1 and are operated thereby. As shown, chains 7 support opposite end portions of the shaft 4 and are connected at their upper ends to the main frame 3 and at their lower ends to blocks 8, in which the shaft 4 is mounted.

A shaft 9 is arranged about at a right angle to the operating-shaft 4 and is located in the rear thereof and is provided with a friction drive-wheel 10, secured to its rear end in any determinate way to cause the parts 9 and 10 to rotate in unison. A bevel-gear 11 is secured to the front end of the shaft 9 and meshes with a companion bevel-gear 12, secured to the shaft 4. A housing 13 is mounted upon the shaft 4 and has the shaft 9 journaled thereto, said housing protecting the gearing 11 and 12 besides forming a support for the shaft 9 and the actuating mechanism.

The cutter 6 comprises a shank and a plate arranged relatively at a right angle to each other, said shank being loosely mounted upon the rear end of the shaft 9 and normally held in frictional engagement with the drive-wheel 10, so as to rotate therewith. The shank is sufficiently resilient to admit of its being moved away from the drive-wheel 10, as indicated by the dotted lines in Fig. 3, thereby permitting rotation of the drive-wheel 10 without imparting corresponding movement to the blade or cutter. Under normal conditions the shank of the cutter is in frictional engagement with the drive-wheel and is moved away therefrom when required by means of a trip 14, which is pivotally connected between its ends to the housing 13, its lower end portion 15 being curved to conform to the drive-wheel 10 and extended beyond the plane thereof to come in contact with the shank of the cutter 6 and move the same away from the drive-wheel 10, as indicated by dotted lines in Figs. 1 and 3, thereby permitting the cutter to remain inactive while the drive-wheel 10 continues to rotate. A spring 16 normally holds the curved end of the trip 14 within the path of the cutter, as indicated most clearly in Fig. 1. A handle-bar 17 is connected to the housing 13 and extends within convenient reach of the driver's seat to admit of independent adjustment and manipulation of the attachment as may be required. An elbow-lever 18 is pivotally connected to the handle-bar 17, and one end is connected to a hand-latch 19, and the opposite end is connected, by means of a link 20, with the trip 14. By operating the hand-latch 19 the trip 14 is moved so as to release the cutter and permit operation thereof. When the hand-latch 19 is repressed so as to hold the trip 14 out of the path of the cutter, the latter is continuously driven and thins the rows regularly. However, should it appear that healthy plants are to be sacrificed and sickly ones left standing the operator may by proper control of the hand-latch cut down the sickly plants and leave the healthy ones standing.

The rollers at the ends of the operating-shaft 4 have a ratchet connection therewith to admit of their backward rotation without imparting corresponding movement to the shaft 4, while at the same time causing the shaft and roller to rotate together when the rollers have a forward movement imparted thereto. The construction of the rollers and adjunctive parts is shown most clearly in Fig. 5. A collar 21 is secured to the shaft 4 by means of a pin 22 and is provided upon its inner end with ratchet-teeth 23. Plates or heads 24 and 25 are loosely mounted upon the shaft 4 and are connected by means of plates 26. A shell 27 is confined between the heads 24 and 25 and is expansible to admit of varying the diameter of the roller according to the relative speed of the shaft 4. A series of concentric grooves 28 are formed in the inner face or side of each head and are adapted to receive the outer ends or edges of the shell 27. The plate or head 25 is formed upon its inner side with a tubular extension 29, terminating in teeth 30, which match and coöperate with the teeth 23. A spring 31, mounted upon the shaft 4 and confined between the collar 21 and head 24, exerts an outward pressure upon the roller, so as to hold the teeth 23 and 30 in meshing relation. The shell 27 is preferably composed of a plate or strip rolled upon itself to form a cylinder, the edge portions of the strip being overlapped to admit of expansion of the shell when required without opening the same. The shell is composed of an inner metallic portion $a$ and an outer part $b$, of leather or like material, to engage frictionally with the rim of the ground-wheels, so as to prevent slipping and insure rotation of the rollers and parts deriving power therefrom.

A rod or like connection 32 joins the housing 13 with a bar or convenient part of the cultivator to cause both the cultivator and the cutting mechanism to move laterally together.

Having thus described the invention, what is claimed as new is—

1. In mechanism for thinning rows of plants, a drive-wheel, a cutter normally held in frictional contact with said drive-wheel and actuated thereby, and a trip projected into the path of said cutter for moving it away from the drive-wheel to admit of the cutter becoming inactive without interfering with the continued rotation of the drive-wheel, substantially as set forth.

2. In mechanism for thinning rows of plants, the combination of a friction-driver, a cutter normally in frictional contact with said driver and operated thereby, a trip normally extended into the path of the cutter to disengage it from said driver at a determinate point in its revolution, and means for withdrawing the trip out of the path of the cutter to admit of its again coming in contact with the driver and rotating therewith, substantially as set forth.

3. In mechanism for thinning rows of plants, the combination of a friction-driver, a cutter receiving motion therefrom, a pivoted trip having an end portion curved and extended into the path of the cutter to effect disengagement thereof from its driver, and operating means for the trip to effect withdrawal thereof from the path of the cutter, substantially as described.

4. In mechanism for thinning rows of plants, the combination of a shaft provided with friction-rollers, adapted to derive power from ground-wheels, a second shaft, gearing between the two shafts, a housing for said gearing mounted upon the first shaft and constituting a support for the second shaft, a drive-wheel secured to the second shaft for rotation, a cutter loosely mounted upon the second shaft, and operated by frictional engagement with said drive-wheel, and a trip adapted to effect disengagement of the cutter from its driver, substantially as specified.

5. In mechanism for thinning rows of plants, the combination of a shaft provided with friction-rollers adapted to derive power from ground-wheels, a second shaft, gearing between the two shafts, a housing for said gearing mounted upon the first shaft and constituting a support for the second shaft, a drive-wheel secured to the second shaft for rotation, a cutter loosely mounted upon the second shaft and operated by frictional engagement with said drive-wheel, a trip pivotally connected to said housing and adapted to effect disengagement of the cutter from the drive-wheel, a handle-bar attached to said housing and operating means for said trip supported by means of said handle-bar, substantially as specified.

6. In combination, an operating-shaft, a cutter, connecting means between said shaft and cutter for operating the latter, friction-rollers loosely mounted upon said shaft, and clutches between the friction-rollers and their supporting-shaft, substantially as specified.

7. In combination, an operating-shaft, a cutter, connecting means between said shaft and cutter for operating the latter, friction-rollers mounted upon said shaft and comprising heads, and an intermediate expansible shell to admit of varying the diameter of the rollers according to the relative speed of the cutter, substantially as described.

In testimony whereof I affix my signature in presence of two witnesses.

FRANKLIN H. KERR. [L. S.]

Witnesses:
EDWARD N. JOHNSON,
MARY SMELSER.